UNITED STATES PATENT OFFICE.

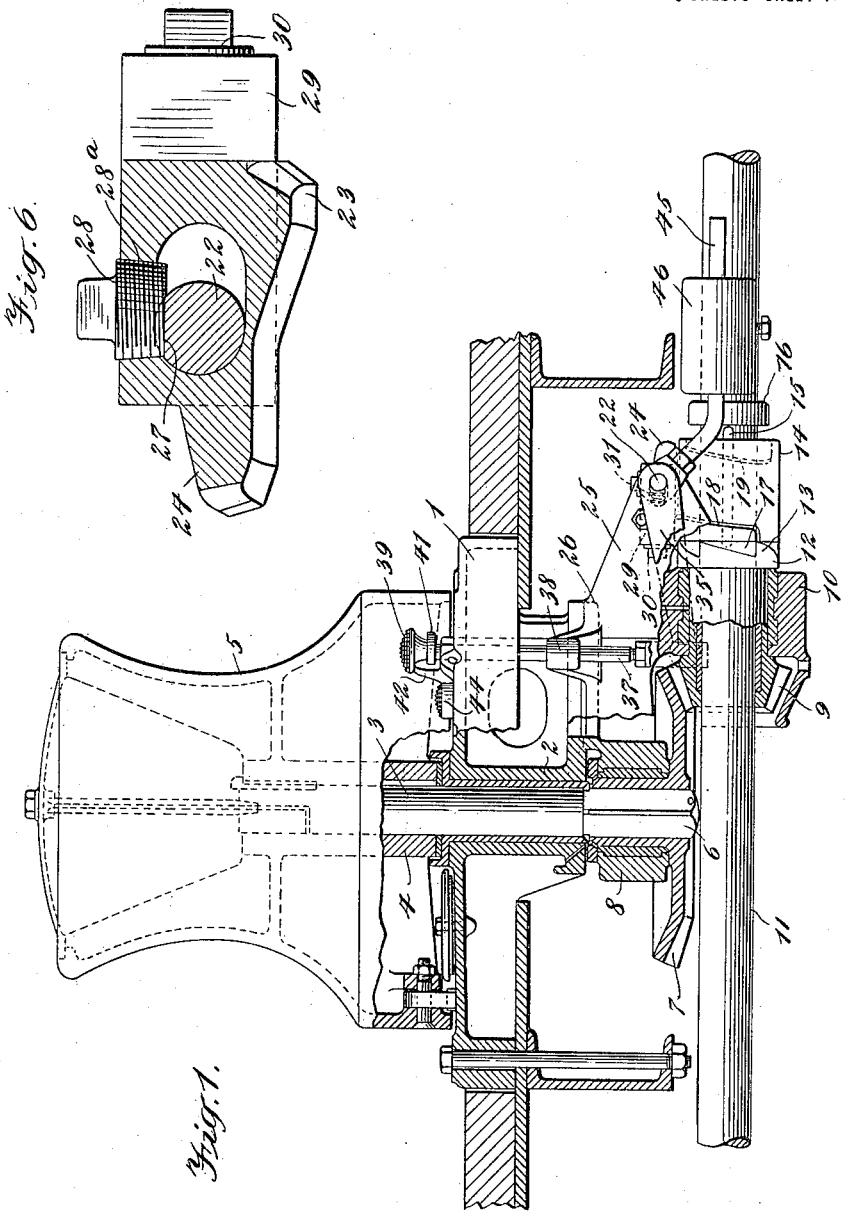

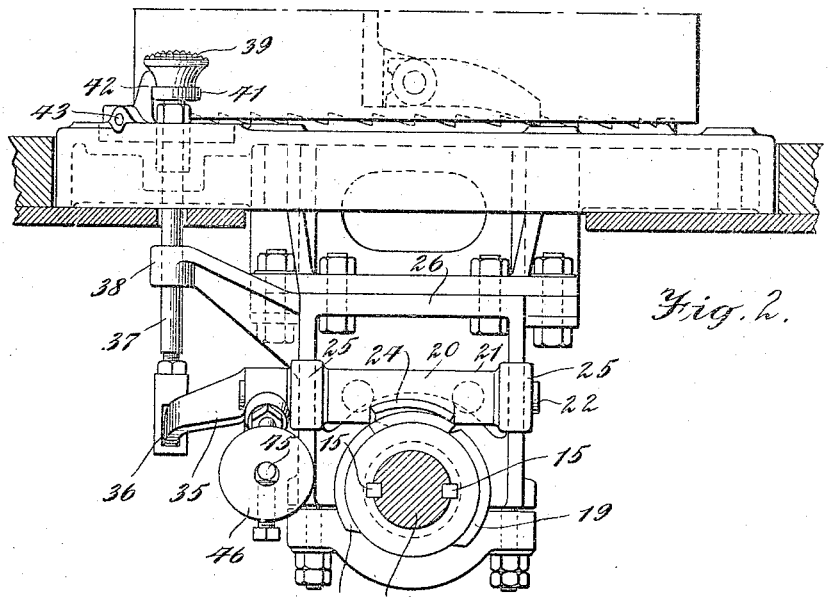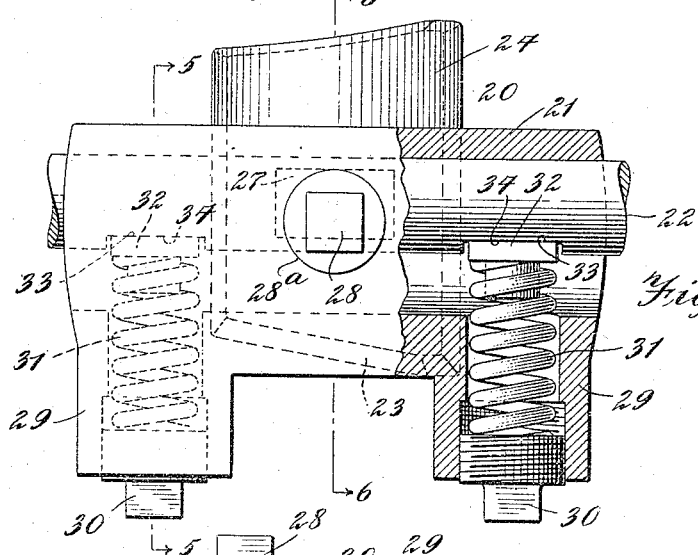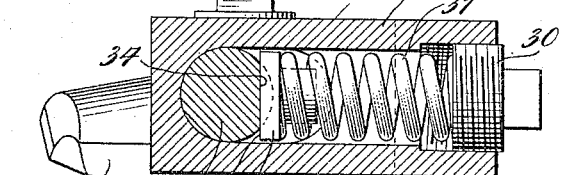

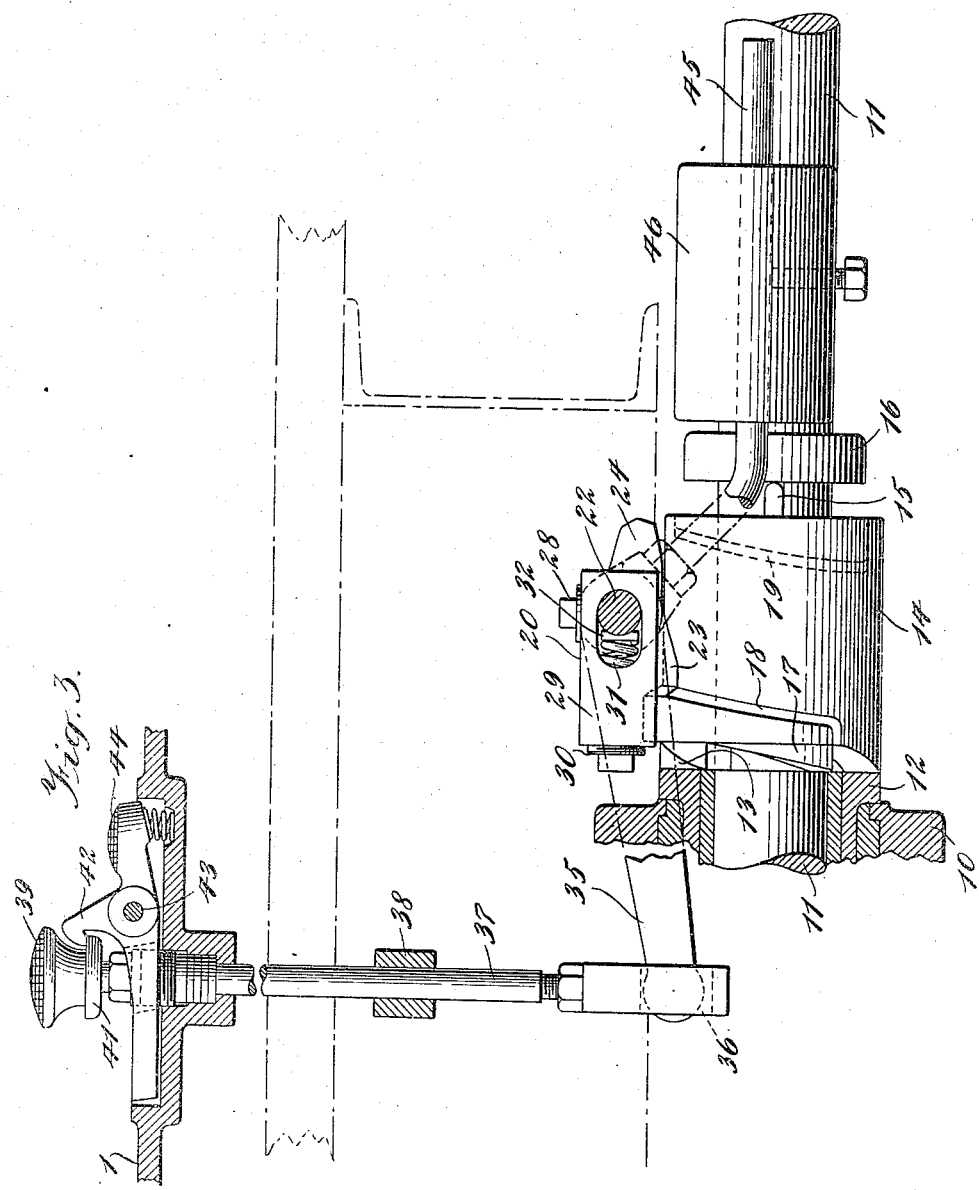

CYRUS EVERS AND FRITIOF CARLSSON, OF NEW YORK, N. Y., ASSIGNORS TO LIDGER-WOOD MANUFACTURING COMPANY, OF NEW YORK, N. Y., A CORPORATION OF NEW YORK.

CLUTCH-OPERATING MEANS.

1,203,994.      Specification of Letters Patent.      Patented Nov. 7, 1916.

Application filed December 30, 1914. Serial No. 879,627.

*To all whom it may concern:*

Be it known that we, CYRUS EVERS, a citizen of the United States, and FRITIOF CARLSSON, a subject of the King of Sweden, residing in New York city, borough of Brooklyn, in the county of Kings and State of New York, have invented certain new and useful Improvements in Clutch-Operating Means, of which the following is a specification.

Our invention relates to new and useful improvements in clutch-operating means and particularly contemplates improvements in such means as is disclosed in the application of Fritiof Carlsson, one of the applicants herein, filed January 3, 1914, Serial No. 810,106.

In said application is shown a rotatable clutch member having cam surfaces with which coöperates a controlling device to engage said cams to shift said rotatable member to engage or disengage a clutch, and our present invention has for its object to so cushion strains and shocks on said controlling device in operating said rotatable member, or resulting from the engagement of the clutch members, as to obviate undue wear, breakage, strains, or derangement of the parts.

In the preferred embodiment of our invention, hereinafter described, we accomplish the object stated by supporting said controlling device upon a yielding support so that its movements are cushioned when it is placed in engagement with said rotatable member, whereby wear between the parts or impact between the same is compensated so as to relieve the structure from undue strains.

Our invention consists in the improvements to be more fully described hereinafter and the novelty of which will be particularly pointed out and distinctly claimed.

We have fully and clearly illustrated a preferred embodiment of our invention in the accompanying drawings, to be taken as a part of this specification and wherein:

Figure 1 is a view in side elevation, partly in section. Fig. 2 is a section on the line 2—2 of Fig. 1. Fig. 3 is an enlarged detail view in side elevation, and partly in section of the clutch-operating means. Fig. 4 is an enlarged detail top plan view, partly in section, of the controlling or clutch-shifting device. Fig. 5 is a section on the line 5—5 of Fig. 4. Fig. 6 is a section on the line 6—6 of Fig. 4.

In order that our invention and its application may be fully understood, we will first briefly describe in part the construction shown in said application Serial No. 810,106, the invention being shown as adapted for the setting and unsetting of a clutch for means for driving a rope capstan.

Referring to the drawings by characters of reference, 1 designates a deck-plate having a vertically disposed central bearing 2 in which turns a vertical shaft 3 carrying at its upper end above the deck-plate the hub 4 of a capstan 5. The lower end of the shaft is squared, as at 6, and carries a beveled gear 7 fixed to the shaft and turning in a bearing 8. The gear 7 meshes with a beveled pinion 9, the hub of which revolves in a horizontally-disposed bearing 10, said gear being sleeved upon a power shaft 11 so as to permit free rotative movement between the same except when said gear is coupled to the shaft, as will be described. The beveled pinion 9 is provided at its rear end with a clutch-head 12 provided with clutch teeth 13. Mounted on the shaft 11 to one side of the clutch-head 12, and carried by the shaft, is a clutch element in the form of a sleeve 14 keyed to the shaft, as at 15, to turn therewith but capable of movement longitudinally thereof between the clutch-head 12 and a stop collar 16 on the shaft at the opposite end of said sleeve 14 from the clutch-head 12. The sleeve 14 is provided, at its end adjacent the clutch-head 12, with clutch teeth 17 adapted to coöperate with the teeth 13, heretofore described, to clutch the beveled pinion 9 to the driving shaft when said sleeve and gear are connected, as shown in Figs. 1 and 3. The element 14 is provided on its opposite ends with oppositely-inclined cam surfaces 18, 19, adapted to be engaged alternately by a controlling device to cause the power exerted by the power shaft to force said sleeve longitudinally of the shaft to connect it with the beveled pinion 9 or disconnect it therefrom. This controlling device preferably consists of a rocking element 20 in the form of a hollow body or sleeve 21 mounted on a rock-shaft 22, said element having oppositely disposed fingers 23, 24, which, when the said element is rocked, as hereinafter described, are respectively adapted to be moved into position to be engaged by the cam inclines 18, 19. The rock shaft is mounted at its ends to rock in suitable bracket-arms 25, preferably forming part of a hanger 26 supported from the deck-plate, although other means may be provided for supporting said shaft, if desired. The bore of the body 21 is substantially elliptical in cross-section, as appears more clearly from Figs. 3, 4, 5 and 6, being at one axis of greater diameter than the diameter of the cylindrical shaft 22, and at the other or smaller axis of such diameter as to closely fit said shaft, so that said element may move in one direction transversely of the shaft relative to the latter.

The rock shaft is formed on one side with a flattened face 27 adapted to be engaged by the end of a fastening screw 28 threaded through an opening 28ª in the body of said controlling element whereby the said element is connected to the shaft 22 to rock therewith. This screw 28 extends at right-angles to the long axis of the bore of the element 20 and slidably engages said face 27 so that said element may move transversely of the shaft but cannot rotate about the same. The element 20 is provided on opposite sides of the sleeve composing the same with laterally projected hollow chambers 29, 29, communicating at their inner ends with the longitudinal bore of said body, but closed at their outer ends preferably by threaded plugs 30, 30. Housed within these chambers 29, 29, are helical springs 31, 31, one in each chamber, said springs extending longitudinally of said chambers and having their respective ends abutting said plugs 30, 30, and one side of the shaft 22, and exerting their forces expansively against said plugs and shaft to hold the shifting element with one end of its elliptical bore seated against the shaft 22, whereby movement of said element transversely of said shaft will be cushioned. We preferably provide the inner end of each spring with a plunger-head 32 having a flat face 33 seated against a flat face 34 on said rock-shaft, said flat faces 34 being on opposite sides of the face 27 and lying in a plane at right-angles to said face.

Rigidly connected to one end of the rock shaft 22 is a lever arm 35 the free end of which is seated in opening 36 in the lower end of a vertical reciprocable pedal plunger 37 guided in a bracket 38 supported from the deck-plate, the upper end of said pedal plunger projecting upward through a sleeve in the deck-plate and having at its upper end a pedal head 39 adapted to be engaged by the foot of an operator and thereby depressed to rock said shaft 22 in one direction—that is, in the direction to throw the finger 23 in the path of movement of the cam incline 18 to cause the sleeve 14 to be moved lengthwise of the shaft 22 in a direction to connect the clutch teeth 17 with the clutch teeth 13 on the beveled pinion 9. The pedal plunger, at a point above the plate 1, may be provided with a locking flange 41 adapted to be engaged by a locking detent 42 pivoted on a pin 43 mounted on the plate 1. This detent is provided with a foot-piece 44 to be engaged by the foot of the operator to throw the detent out of engagement with the pedal plunger. As long as the pedal plunger is depressed the finger 23 will be held in position to hold the elements 14 and 9 in driving relation. On the rock shaft and extending in the opposite direction from the lever 35 is a lever 45 carrying an adjustable weight 46, said weight and lever operating when the pedal plunger is released to rock the controlling device to raise the finger 23 and lower the finger 24, so that the latter is in position to be engaged by the cam 19 to cause the element 14 to be moved away from the beveled pinion 9 and thereby disconnect the clutch teeth between said elements.

It will be seen that, when the controlling device 20 is rocked to throw the finger 23 into position to be engaged by the cam 18, the engagement of said cam with said finger will be cushioned by the springs 31, 31, to such an extent as to permit movement of the controlling member relative to its shaft, and thereby prevent undue wear of said finger, or breakage thereof, as well as undue strains upon the rock-shaft 22, its bearings, and support. It will be understood, however, that the springs are made strong enough so that they cannot be compressed to such an extent as to permit the controlling device to be moved on the shaft to such a degree as not to provide proper engagement between the finger 23 and the cam 18 to shift the rotatable member 14 to properly engage the clutch-teeth 13 and 17. This yieldable mounting for the shifting device prevents derangement of parts due to the jars resulting from engagement of the said clutch-teeth, particularly when the engagement initially takes place between the clutch faces proper before the element 14 has been shifted the full extent of its movement in clutch-setting direction; that is, the engagement of the high parts of the clutch teeth.

It is believed the operation of the invention will be apparent from the above description taken in connection with the drawings, but it may be briefly set forth as follows: When it is desired to set the clutch, the operator depresses the pedal plunger which operates to rock the element 20 to move the finger 23 into the path of rotation of the cam 18, whereby the power exerted by the rotation of the shaft will cause the engagement of said cam with said finger to shift the element 14 lengthwise of the shaft to engage the clutch teeth 13 and 17, whereby said pinion 9 is driven. It will be understood that, in the event the clutch teeth should not be in proper position to completely engage and the high points of the teeth should lock, even momentarily, the force exerted by the cam striking the finger 23 will be cushioned, due to the relative movement between the controlling device and the shaft 22 so that said device, the shaft 22 and the parts supporting the same, will be relieved of such excess strain as might derange the parts or cause breakage. When the clutch parts are to be disengaged, the pedal plunger is released to permit the weight 40 to swing the controlling device 20 to raise the finger 23 and lower the finger 24 so that the latter is in the path of the cam 19 on the member 14, whereby the engagement of said cam with said finger throws the member 14 lengthwise of the shaft to disengage the teeth 13 and 17.

We have herein illustrated and described the clutch teeth 17 as formed integrally with the sleeve 14 keyed to shaft 11. However, in practice it may be found convenient to form the said clutch teeth 17 on a ring or sleeve independent of sleeve 14. Such a change is within the spirit of the invention. It will also be understood that the invention is not confined to those devices known as "jaw clutches", but is applicable also to friction clutches.

What we claim and desire to secure by Letters Patent of the United States is:—

1. In combination, a shaft, clutch members one of which is mounted on said shaft for movement toward and away from the other, a cam incline on said movable clutch-member, a rocking member adapted to engage said incline to move the said movable clutch-member, and means for cushioning said rocking member.

2. In combination, a shaft, clutch members one of which is mounted on said shaft for movement toward and away from the other, a cam incline on said movable clutch-member, a rocking member adapted to engage said incline to move the said movable clutch-member, and a cushioned support for said rocking member.

3. In combination, a shaft, clutch members one of which is mounted on said shaft for movement toward and away from the other, a cam incline on said movable clutch-member, a rocking member adapted to engage said incline to move the said movable clutch-member, a rock shaft upon which said rocking member is movably mounted, and cushioning means between said rock shaft and rocking member.

4. In combination, a shaft, clutch members one of which is mounted on said shaft for movement toward and away from the other, a cam incline on said movable clutch-member, a rocking member adapted to engage said incline to move the said movable clutch member, and a rock shaft upon which said rocking member is mounted for movement relative thereto under strain.

5. In combination, a shaft, clutch members one of which is mounted on said shaft for movement toward and away from the other, a cam incline on said movable clutch-member, a rocking member adapted to engage said incline to move the said movable clutch-member, a rock shaft upon which said rocking member is mounted for movement relative thereto under strain, and a spring between said rock shaft and rocking member to cushion the latter.

6. In combination, a shaft, clutch members one of which is mounted on said shaft for movement toward and away from the other, a cam incline on said movable clutch-member, a rocking member adapted to engage said incline to move the said movable clutch-member, a rock shaft upon which said rocking member is mounted to rock and for movement transversely of said rock shaft, and a spring between said rock shaft and rocking member.

7. In combination, a shaft, clutch members one of which is mounted on said shaft for movement toward and away from the other, a cam incline on said movable clutch-member, and a yieldingly mounted member adapted to engage said incline to move the said movable clutch-member.

8. In combination, a shaft, clutch members one of which is mounted on said shaft for movement toward and away from the other, a cam incline on said movable clutch-member, a yieldingly mounted member adapted to engage said incline to move the said movable clutch member, a shaft for moving said engaging member, and a cushion between the latter and said shaft.

9. In combination, a shaft, clutch members one of which is mounted on said shaft for movement toward and away from the other, a cam incline on said movable clutch-member, a rock shaft, a member thereon to be rocked to engage said cam incline, said member having movement transversely of said shaft, a chamber in said member and a cushion in said chamber between said member and rock shaft.

10. In combination, a shaft, clutch members one of which is mounted on said shaft for movement toward and away from the other, a cam incline on said movable clutch-member, a rock shaft, a member thereon to be rocked to engage said cam incline, said member having movement transversely of said shaft, a chamber in said member, a cushion in said chamber between said member and rock shaft, and a fastening device extending through said member and slidably engaging said rock shaft.

11. In combination, a shaft, clutch members one of which is mounted on said shaft for movement toward and away from the other, a cam incline on said movable clutch-member, a rock shaft, a member thereon to be rocked to engage said cam incline, said member having movement transversely of said shaft, a chamber in said member, a cushion in said chamber between said member and rock shaft, and a fastening device extending through said member and slidably engaging said rock shaft and seated at one end on a flat face on said rock shaft.

12. In combination, a shaft, clutch members one of which is mounted on said shaft for movement toward and away from the other, a cam incline on said movable clutch member, a rock shaft, a member thereon to be rocked to engage said cam incline, said member having a bore receiving said shaft and of greater width in one direction than said shaft, chambers on the opposite end portions of said member, and a spring in each chamber between said member and rock shaft.

In testimony whereof we have hereunto signed our names in the presence of the subscribing witnesses.

CYRUS EVERS.
FRITIOF CARLSSON.

Witnesses:
THOMAS S. MARTIN,
EDWD. F. BATES.

Copies of this patent may be obtained for five cents each, by addressing the "Commissioner of Patents, Washington, D. C."